2,991,307
PROCESS OF RESOLVING N,N-DIBENZYL-DL-α-AMINO ACIDS AND PRODUCTS

Gaston Amiard, Noisy-le-Sec, René Heymès, Romainville, and Leon Velluz, Paris, France, assignors to UCLAF, Paris, France, a body corporate of France
No Drawing. Filed Nov. 30, 1955, Ser. No. 550,189
Claims priority, application France Dec. 14, 1954
8 Claims. (Cl. 260—501)

The present invention relates to a new process of resolving DL-amino acid compounds and more particularly to a process of resolving N,N-dibenzyl-DL-amino acids into their optically active components, and to such products.

In co-pending application Serial No. 518,337 of Jesus Anatol and Vesperto Torelli filed June 27, 1955, now U.S. Patent No. 2,917,541 and entitled New N,N-Dibenzyl Amino Acid Compounds and Process of Making Same, there are described new N,N-dibenzyl amino acids of the following Formula I

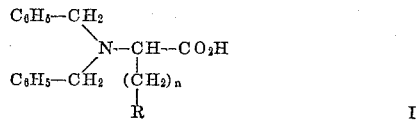

wherein R indicates hydrogen, an alkyl radical which may be substituted by a hydroxyl group or by a sulfur containing group, an aryl radical, or a heterocyclic radical, while $n$ is 0 or an integer between 1 and 8; and a simple and effective process of making such compounds is given.

The new compounds according to the above given Formula I differ advantageously from most of the known N-derivatives of amino acids by their ability to readily crystallize and to be soluble in neutral, water-immiscible, organic solvents such as chloroform, benzene, diethyl ether, and di-isopropyl ether. Said new compounds also permit formation of hydrochlorides which are likewise readily soluble in organic solvents and which are stable in acid and alkaline medium. Said properties of the hydrochlorides facilitate their purification.

The amino group of said N,N-dibenzyl amino acids is readily set free by hydrogenolysis.

The dibenzyl compounds corresponding to Formula I can be employed not only for preparing N,N-dibenzyl peptides after their conversion into acid halogenides or mixed anhydrides, but also for the synthetic preparation of the corresponding non-substituted very pure amino acids.

The process of making these compounds as described in said co-pending application leads to the formation of the racemic DL-compounds. Said N,N-di-benzyl-DL-α-amino acids can be resolved into their optically active components by converting them into salts with optically active bases. The presence of the N,N-dibenzyl group in such compounds increases the molecular size and, therefore, tends to facilitate crystallization of the optically active salts. Regeneration of the free amino acid by hydrogenolysis is effected without racemization.

It is one object of the present invention to provide a simple, effective, and inexpensive process of resolving the racemic N,N-dibenzyl amino acids obtained according to the process of said co-pending application Serial No. 518,337, now U.S. Patent No. 2,917,541 into their optically active components and to obtain therefrom the corresponding optically pure amino acids by simple hydrogenolysis.

Another object of this invention is to provide new optically active N,N-dibenzyl amino acids which are useful for the preparation of optically active N,N-dibenzyl peptides as well as for the preparation of very pure optically active amino acids.

Other objects of the present invention and advantageous features thereof will become apparent as the description proceeds.

The conversion of the resulting optically active N,N-dibenzyl amino acids into optically active N,N-dibenzyl peptides is carried out, for instance, in an analogous manner as disclosed and claimed in co-pending applications Serial No. 488,702, of Gaston Amiard and Leon Velluz, filed February 16, 1955, now U.S. Patent No. 2,948,714 and entitled New N-Benzyl Peptides and a Process of Making Same and Serial No. 488,701 of Leon Velluz, Jesus Anatol, and Gaston Amiard, filed February 16, 1955, now U.S. Patent No. 2,927,107 and entitled N,N-Dibenzyl Peptides and a Process of Making Same. According to said processes, for instance, the hydrochloride of an acid chloride of an N-benzyl or N,N-dibenzyl-α-amino acid is condensed with the hydrochloride of a readily saponifiable ester of an amino acid. The hydrochloride of the resulting ester of the N-benzyl or of the N,N-dibenzyl peptide can readily be isolated and purified on account of its solubility in chloroform. By subsequent saponification by means of alkaline agents the N-benzyl or the N,N-dibenzyl peptide is formed. By hydrogenolysis of said benzylated peptide, the free peptide is produced.

If the benzyl ester is employed in this reaction as ester of the amino acid, simple hydrogenolysis permits to convert, in one operation, the benzyl ester of said N-benzyl or N,N-dibenzyl peptide into the free peptide. It is also possible to first convert the N,N-dibenzyl-α-amino acids into suitable mixed anhydrides and preferably into mixed anhydrides with the esters of chloroformic acid. For this purpose, an N,N-dibenzyl substituted α-amino acid or peptide is reacted, preferably at a temperature near 0° C. and in an organic solvent such as, for instance, chloroform, with an agent capable of forming a mixed anhydride therewith, such as, for instance, the ethyl ester of chloroformic acid, in the presence of an acid binding agent and especially in the presence of an agent capable of binding hydrochloric acid, for instance, in the presence of triethylamine. The resulting solution of the mixed anhydride is directly treated, at a temperature preferably near 0° C., with an α-amino acid or a peptide the carboxyl groups of which are protected, for instance, by ester formation. Thereby the N,N-dibenzyl substituted peptide having its carboxyl group protected is obtained. Said compound can readily and directly be isolated and crystallized, preferably in the form of its hydrochloride or of the free N,N-dibenzyl substituted ester.

As stated above, the optically active amino acids and peptides can readily be recovered from their optically active N,N-dibenzyl substituted derivatives by hydrogenolysis whereby no racemization takes place.

In principle, the process according to the present invention consists in converting the N,N-dibenzyl-DL-α-amino acid to be resolved into optically active salts with L(+)- or D(−)-threo-1-p-nitro phenyl-2-amino propane-1,3-diol. Said salts, in general, and under suitable reaction conditions, permit separation of the L(+)-threo-1-p-nitro phenyl-2-amino propane-1,3-diol salt of the N,N-dibenzyl-L(−)-amino acid or, respectively, the D(−)-threo-1-p-nitro phenyl-2-amino propane-1,3-diol salt of the N,N-dibenzyl-D(+)-amino acid in a pure state. The resulting pure, optically active salts can be split up into the corresponding pure optically active N,N-dibenzyl amino acids which, in turn, yield, on hydrogenolysis, the pure, optically active amino acids.

The D(−)- or L(+)-threo-1-(p-nitro phenyl)-2-amino propanediols-(1,3) used as resolving agents for salt formation with the optically active components of N,N-dibenzyl-DL-amino acids are obtained in the course of the synthesis of chloramphenicol and preferably by the resolving process disclosed by Velluz, Amiard, and Joly in the Bull. Soc. Chim. 1953, page 342.

The resolving process according to the present invention has the particular advantage that use is made of the valueless L(+)-threo-1-p-nitro phenyl-2-amino-propane-1,3-diol which is obtained as a by-product in the chloramphenicol synthesis.

L(+)-threo-1-p-nitro phenyl-2-amino propane-1,3-diol has a melting point of 162–163° C. and a rotatory power $[\alpha]_D^{20}=28°\pm2°$ (concentration: 2% in 0.1 N hydrochloric acid).

D(−)-threo-1-p-nitro phenyl-2-amino propane-1,3-diol has a rotatory power $[\alpha]_D^{20}=-28°\pm2°$ (concentration: 2% in 0.1 N hydrochloric acid). F=162–163°.

Both compounds correspond to the following formula

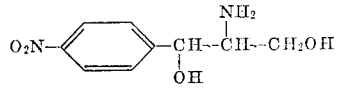

According to the process of the present invention L(+)- or D(−)-threo-1-p-nitro phenyl-2-amino propane-1,3-diol is added to a solution of the N,N-dibenzyl-DL-α-amino acid to be resolved or to a mixture of the two enantiomorphic components of such a racemate in a suitable solvent such as aqueous methanol or ethanol at an elevated temperature between about 30° C. and the boiling point of said solvent, preferably at a temperature of about 70° C. The reaction mixture is then gradually cooled. Thereby, preferred crystallization of the less soluble salt formed between the resolving agent and one of the two enantiomorphic components of the initial racemic mixture sets in, while the more soluble salt of said resolving agent with the other enantiomorphic component remains in solution. Usually, it is sufficient to separate the crystalline precipitate in order to obtain the substantially pure salt of the optically active N,N-dibenzyl amino acid. If necessary, said product may be recrystallized from a suitable solvent which may be the same as that used in the resolving procedure or may differ therefrom.

The crystalline precipitate obtained in this manner and consisting of the optically active salt of the two reaction components is treated with an alkaline agent, thereby causing splitting off of the resolving agent which can be recovered almost quantitatively. After removing the insoluble resolving agent, the resulting alkaline metal salt solution is acidified to yield one of the optically active forms of the starting N,N-dibenzyl-DL-α-amino acid in an optically pure form.

The mother liquors remaining after precipitation and separation of the optically active salts of low solubility are worked up in a similar manner, i.e. by splitting off the resolving agent by alkaline hydrolysis, separating the resolving agent recovered thereby, and acidifying the resulting alkaline solution. The thus obtained enantiomorphic compound can readily be purified by recrystallization from a suitable solvent. In cases where more thorough purification is required, the impure product is precipitated by reaction with the corresponding other optically active threo-1-p-nitro phenyl-2-amino propane-1,3-diol. It is also possible to convert said impure product directly into the racemic mixture by processes known per se. The resulting racemic mixture is then again subjected to the resolving process according to the present invention. By alternative resolution and racemization it is possible to convert all of the originally present racemic mixture into the desired enantiomorphic compound.

The following examples serve to illustrate the present invention without, however, limiting the same thereto. For instance, it is possible to vary the nature of the solvent, the temperatures during dissolution and crystallization, the time required for cooling, and other measures taken in the preparation of salts of D(−)- or L(+)-threo-1-p-nitro phenyl-2-amino propane-1,3-diol with the respective optically active N,N-dibenzyl amino acids. One may also add a second solvent or a mixture of solvents of dissolution, crystallization, and/or precipitation of the optically active salts and may employ other appropriate measures, without departing from the principle of this invention as set forth in the specification and in the claims annexed hereto.

EXAMPLE 1

*Resolving of N,N-dibenzyl-DL-alanine*

(A) PREPARATION OF THE SALT OF L(+)-THREO-1-p-NITRO PHENYL-2-AMINO PROPANE-1,3-DIOL OF N,N-DIBENZYL-L-(−)-ALANINE 13.5 g. of N,N-dibenzyl-DL-alanine and 11.0 g. of L(+)-threo-1-p-nitro phenyl-2-amino propane 1,3-diol are heated under reflux in 120 cc. of absolute ethanol. 140 cc. of warm water are gradually added thereto. The mixture is allowed to cool slowly to a temperature of 30° C., the precipitated salt is filtered off, washed with a small quantity of aqueous alcohol containing 60% of water, and recrystallized from a mixture of 60 cc. of ethanol and 70 cc. of water. The crystals are filtered off at 25° C. yielding 10.3 g. of the salt of L(+)-threo-1-p-nitro phenyl-2-amino propane-1,3-diol and N,N-benzyl-L(−)-alanine. The yield amounts to 42.5% corresponding to a resolving yield of 85%. The salt is obtained in the form of yellow leaflets which are insoluble in water and only slightly soluble in ethanol, ether, acetone, benzene, and chloroform. The salt melts at 177–178° C.; its rotatory power is $[\alpha]_D^{20}=-15°\pm1°$ (concentration: 1% in methanol).

(B) PREPARATION OF THE SALT OF D(−)-THREO-1-p-NITRO PHENYL-2-AMINO PROPANE-1,3-DIOL AND N,N-DIBENZYL-D(+)-ALANINE

The mother liquors resulting from the preparation and recrystallization of the above described salt of L(+)-threo-1-p-nitro phenyl-2-amino propane-1,3-diol and N,N-dibenzyl-L(−)-alanine are collected and are allowed to stand at room temperature overnight. Thereby, 0.9 g. of a salt rich in the levorotatory diastereoisomer precipitate. Said salt is separated and may be added to a new charge to be resolved.

The resulting filtrate is concentrated in a vacuum to a volume of about 150 cc. and is rendered alkaline by the addition of 28 cc. of N sodium hydroxide solution. L(+)-threo-1-p-nitro phenyl-2-amino propane-1,3-diol crystallizes and is removed from the filtrate. 3.85 g. thereof corresponding to 35% of the amount of resolving agent initially employed are recovered. The alkaline filtrate is then acidified by the addition of 2 cc. of acetic acid. The oily precipitate is extracted three times with 25 cc., 10 cc., and 10 cc. of chloroform. The combined chloroform solutions are washed twice, each time with 10 cc. of water, dried over magnesium sulfate, and evaporated to dryness in a vacuum. 6.2 g. of the impure trihydrate of N,N-dibenzyl-D(+)-alanine are obtained thereby. Said compound is treated in the same manner as described above under (A) with 4.8 g. of D(−)-threo-1-p-nitro phenyl-2-amino propane-1,3-diol and yields thereby the salt of D(−)-threo-1-p-nitrophenyl-2-amino propane-1,3-diol and N,N-dibenzyl-D(+)-alanine. The yield amounts to 70% calculated for the racemic mixture employed initially. Said salt is obtained in the form of yellow leaflets which are insoluble in water and only slightly soluble in ethanol, ether, acetone, benzene, and chloroform. Its melting point is 177–178° C.; its rotatory power is $[\alpha]_D^{20}=+15°\pm1°$ (concentration: 1% in methanol).

(C) PREPARATION OF N,N-DIBENZYL-L(−)-ALANINE 10.3 g. of the salt of L(+)-threo-1-nitro phenyl-2-amino propane-1,3-diol and N,N-dibenzyl-L(−)-alanine prepared as described hereinabove under (A), are vigorously agitated with 22.5 cc. of N sodium hydroxide solution for 15 minutes. L(+)-threo-1-p-nitro phenyl-2-amino propane-1,3-diol crystallizes and is separated from the solution. 4.4 g. thereof are recovered thereby. The yield of recovered resolving agent is 40% of the amount initially employed in the resolving procedure described hereinabove under (A). The filtrate is acidified by the addition of 1.5 cc. of acetic acid. The oily precipitate is extracted by means of chloroform and the resulting solution is washed with water as indicated hereinabove under (B). The chloroform solution is dried over magnesium sulfate and evaporated to dryness in a vacuum. The resulting residue is again dissolved in one part by volume of chloroform. 30 cc. of water are added thereto. The chloroform is removed therefrom by vacuum distillation in the cold. The resulting crystalline mass is filtered off. 5.8 g. of the trihydrate of N,N-dibenzyl-L(—)-alanine are obtained thereby. It forms white needles which are insoluble in water and soluble in ethanol, ether, and acetone. Its melting point is 64–65° C.; its rotatory power is $[\alpha]_D^{20} = -45° \pm 1°$ (concentration: 2% of the anhydrous compound in methanol). The yield of the anhydrous compound amounts to 70%.

(D) PREPARATION OF THE HYDROCHLORIDE OF L(+)-ALANINE 2 g. of a palladium black catalyst containing 6% of palladium are added to a solution of 4 g. of the trihydrate of N,N-dibenzyl-L(—)-alanine in 80 cc. of 80% ethanol containing 1.5 cc. of concentrated hydrochloric acid. The reaction mixture is heated to 70° C. Hydrogen is introduced into said mixture. 550 cc. of hydrogen are absorbed within 30 minutes. The catalyst is filtered off and the filtrate is evaporated to dryness. On addition of acetone to the residue the hydrochloride of L(+)-alanine crystallizes. It is filtered off, washed with acetone, and dried. 1.05 g. of the optically pure compound, corresponding to a yield of 70%, are obtained thereby. Its melting point is 205° C.; its rotatory power $[\alpha]_D^{20} = +9.5° \pm 0.5°$ (concentration: 3% in water).

EXAMPLE 2

*Resolving of N,N-dibenzyl-DL-valine*

(A) PREPARATION OF THE SALT OF L(+)-THREO-1-p-NITRO PHENYL-2-AMINO PROPANE-1,3-DIOL AND N,N-DIBENZYL-L(—)-VALINE 11.9 g. of N,N-dibenzyl-DL-valine and 8.9 g. of L(+)-threo-1-p-nitro phenyl-2-amino propane-1,3-diol are heated under reflux in 150 cc. of methanol. 150 cc. of warm water are gradually added thereto. The mixture is allowed to cool slowly to 25° C. The precipitated salt is filtered off, washed with a small quantity of 50% methanol and recrystallized from 110 cc. of 50% methanol. The crystals are filtered off at 25° C., whereby 8.9 g. of the salt of L(+)-threo-1-p-nitro phenyl-2-amino propane-1,3-diol and N,N-dibenzyl-L(—)-valine are obtained. The yield amounts to 44% corresponding to a resolving yield of 88%. The salt is obtained in the form of yellow leaflets which are insoluble in water, rather soluble in ethanol, slightly soluble in acetone, benzene, and chloroform, and insoluble in ether. The salt melts at 158–160° C., its rotatory power is $$[\alpha]_D^{20} = -41.5° \pm 1°$$

(concentration: 1% in methanol).

(B) PREPARATION OF THE SALT OF D(—)-THREO-1-p-NITRO PHENYL-2-AMINO PROPANE-1,3-DIOL AND N,N-DIBENZYL-D(+)-VALINE

The mother liquors obtained on preparing and recrystallizing the salt of L(+)-threo-1-p-nitro phenyl-2-amino propane-1,3-diol and N,N-dibenzyl-L(—)-valine obtained as described hereinabove under (A), are collected and concentrated by evaporation in a vacuum to a volume of about 130 cc. 24 cc. of N sodium hydroxide solution are added thereto. The mixture is cooled and vigorously agitated with 19 cc. of N sodium hydroxide solution for 15 minutes. L(+)-threo-1-p-nitro phenyl-2-amino propane-1,3-diol crystallizes and is separated from the solution. 3 g. of the resolving agent, corresponding to 34% of the amount initially used for resolving, are recovered. The filtrate is acidified by the addition of 3 cc. of acetic acid. The oily precipitate is separated, dissolved in 55 cc. of warm methanol, and treated as indicated hereinabove under (A) with 4.7 g. of D(—)-threo-1-p-nitro phenyl-2-amino propane-1,3-diol, thereby yielding the corresponding salt of said D(—)-threo-1-p-nitro phenyl-2-amino propane-1,3-diol and N,N-dibenzyl-D(+)-valine. The yield amounts to 79% calculated for the initially employed racemic mixture. The compound is obtained in the form of yellow leaflets which are insoluble in water, rather soluble in ethanol, slightly soluble in acetone, benzene, and chloroform, and insoluble in ether. The salt melts at 158–160° C.; its rotatory power is $[\alpha]_D^{20} = +41° \pm 1°$ (concentration: 1% in methanol).

(C) PREPARATION OF N,N-DIBENZYL-L(—)-VALINE 8.9 g. of the salt of L(+)-threo-1-p-nitro phenyl-2-amino propane-1,3-diol and N,N-dibenzyl-L(—)-valine obtained as described hereinabove under (A), are vigorously agitated with 19 cc. of N sodium hydroxide solution for 15 minutes. L(+)-threo-1-p-nitro phenyl-2-amino propane-1,3-diol crystallizes and is separated from the solution. 3.35 g. thereof corresponding to 38% of the initially employed resolving agent are recovered thereby. The filtrate is acidified by the addition of 2.5 cc. of acetic acid. The acidified mixture is extracted three times with 20 cc., 10 cc., and 10 cc. of chloroform. The combined chloroform solutions are washed with 15 cc. of water, dried, and evaporated to dryness in a vacuum. The resulting oily residue solidifies on trituration with petroleum ether. It is dissolved in dilute sodium hydroxide solution and is caused to crystallize therefrom by acidifying the solution with acetic acid. 4.75 g. of N,N-dibenzyl-L(—)-valine are obtained thereby in hydrated form. The yield amounts to 92% of the theoretical yield. The melting point of the anhydrous product is 75° C. and its rotatory power $[\alpha]_D^{20} = -119.5° \pm 1°$ (concentration: 2% in methanol). The compound is obtained in the form of white needles which are insoluble in water and soluble in ethanol, ether, acetone, benzene, and chloroform.

(D) PREPARATION OF L(+)-VALINE 2 g. of N,N-dibenzyl-L(—)-valine are subjected to hydrogenolysis in 20 cc. of 80% ethanol in the presence of 1 g. of a palladium black catalyst containing 6% of palladium and with the addition of 0.7 cc. of concentrated hydrochloric acid at a temperature of 70° C. After hydrogen absorption ceases, the catalyst is filtered off and washer with ethanol. The filtrate is concentrated by evaporation to a small volume. 1.3 cc. of pyridine are added thereto. The crystallized L(+)-valine is filtered off and washed with ethanol. 660 mg. of optically pure L(+)-valine corresponding to a yield of 80% of the theoretical yield are obtained thereby. Its rotatory power is $[\alpha]_D^{20} = +27.5 \text{ g.} \pm 1°$ (concentration: 2% in 5 N hydrochloric acid.

EXAMPLE 3

*Resolving of N,N-dibenzyl-DL-norvaline*

(A) PREPARATION OF THE SALT OF L(+)-THREO-1-p-NITRO PHENYL-2-AMINO PROPANE-1,3-DIOL AND N,N-DIBENZYL-L(—)-NORVALINE 8.91 g. of N,N-dibenzyl-DL-norvaline and 6.45 g. of L(+)-threo-1-p-nitro phenyl-2-amino propane-1,3-diol are dissolved in 180 cc. of aqueous 50% ethanol at a temperature of 75–80° C. The solution is cooled to 30° C. within 1½ hours. The crystallized salt is filtered off, washed in the cold with a small quantity of 50% ethanol, and recrystallized from 35 cc. of 50% ethanol. After drying the filter residue, 6.2 g. of the salt of L(+)-threo-1-p-nitro phenyl-2-amino propane-1,3-diol and N,N-dibenzyl-L(—)-norvaline are obtained. The resolving yield corresponds to 81% of the theoretical yield. The resulting product is obtained in the form of yellow leaflets which are insoluble in water, only slightly soluble in ethanol, ether, and benzene, and soluble in acetone. The compound melts at 153–156° C.; its rotatory power is $[\alpha]_D^{20} = -24° \pm 1°$ (concentration: 1% in methanol).

(B) PREPARATION OF THE SALT OF D(—)-THREO-1-p-NITRO PHENYL-2-AMINO PROPANE-1,3-DIOL AND N,N-DIBENZYL-D(+)-NORVALINE

The mother liquors obtained on preparing and recrystallizing the salt of L(+)-threo-1-p-nitro phenyl-2-amino propane-1,3-diol and N,N-dibenzyl-L(—)-norvaline are combined. They yield, on standing overnight at room temperature, 0.5 g. of a salt rich in the levorotatory diastereomeric compound. Said salt is separated from the mother liquor and can be added to a new charge of starting material to be resolved. The resulting filtrate is concentrated by evaporation in a vacuum to a volume of 100 cc. and is rendered alkaline by the addition of 19 cc. of N sodium hydroxide solution. Thereby L(+)-threo-1-p-nitro phenyl-2-amino propane-1,3-diol crystallizes. It is separated from the alkaline filtrate whereby 2.25 g., corresponding to 35% of the resolving agent employed, are recovered. The filtrate is acidified by the addition of 2 cc. of acetic acid. The precipitate is separated and is treated in the same manner as described hereinabove in Example 1 under (B). Thereby, the optically pure salt of D(—)-threo-1-p-nitro phenyl-2-amino propane-1,3-diol and N,N-dibenzyl-D(+)-norvaline is obtained. This compound forms yellow leaflets which are insoluble in water, only slightly soluble in ethanol, ether, and benzene and soluble in acetone. The salt melts at 153–156° C.; its rotatory power is $[\alpha]_D^{20} = +24° \pm 1°$ (concentration: 1% in methanol).

Said salt, on decomposition according to the procedure described hereinabove in Example 2 under (C), yields N,N-dibenzyl-D(+)-norvaline. This compound forms white needles which are insoluble in water and soluble in ethanol, ether, acetone, benzene, and chloroform. Its melting point is 118–119° C.; its rotatory power is $$[\alpha]_D^{20} = +71° \pm 1°$$

(concentration: 1% in methanol).

(C) PREPARATION OF N,N-DIBENZYL-L(—)-NORVALINE 6.2 g. of the salt of L(+)-threo-1-p-nitro phenyl-2-amino propane-1,3-diol and N,N-dibenzyl-L(—)-norvaline obtained as described hereinabove under (A) is split up in the same manner as described hereinabove in Example 1 under (C) or Example 2 under (C). Thereby 3.3 g. of optically pure N,N-dibenzyl-L(—)-norvaline, corresponding to 92% of the theoretical yield, are obtained. Said compound forms white needles which are insoluble in water, and soluble in ethanol, ether, acetone, benzene, and chloroform. Its melting point is 118–119° C.; its rotatory power is $[\alpha]_D^{20} = -71° \pm 1°$ (concentration: 1% in methanol).

In the course of said operation, 2.4 g. of L(+)-threo-1-p-nitro phenyl-2-amino propane-1,3-diol are recovered. The yield amounts to 37% of the resolving agent initially employed. Said recovered resolving agent can again be used for resolution.

(D) PREPARATION OF L(+)-NORVALINE 2 g. of N,N-dibenzyl-L(—)-norvaline are hydrogenated in 20 cc. of 80% ethanol in the presence of 1 g. of a palladium black catalyst containing 6% of palladium and with the addition of 0.7 cc. of concentrated hydrochloric acid. Hydrogenation and working up of the reaction mixture is carried out in the same manner as described hereinabove in Example 2 under (D). 630 mg. of optically pure L(+)-norvaline, corresponding to 79% of the theoretical yield, are obtained thereby. Its rotatory power is $[\alpha]_D^{20} = +23.3° \pm 1°$ (concentration: 2% in 5 N hydrochloric acid).

EXAMPLE 4

*Resolving of N,N-dibenzyl-DL-α-amino butyric acid*

(A) PREPARATION OF L(+)-THREO-1-p-NITRO PHENYL-2-AMINO PROPANE-1,3-DIOL AND N,N-DIBENZYL-L(—)-α-AMINO BUTYRIC ACID 40 g. of N,N-dibenzyl-DL-α-amino butyric acid and 31 g. of L(+)-threo-1-p-nitro phenyl-2-amino propane-1,3-diol are dissolved, while heating under reflux, in 500 cc. of absolute ethanol. 360 cc. of warm water are gradually added thereto, thereby maintaining the temperature at the boiling point. The mixture is cooled to 30° C. within two hours. The crystallized salt is filtered off, washed with a small quantity of 50% of ethanol, and recrystallized from 500 cc. of 50% ethanol. 30.5 g. of the salt of L(+)-threo-1-p-nitro phenyl-2-amino propane-1,3-diol and the N,N-dibenzyl-L(—)-α-amino butyric acid are obtained thereby after drying at 80° C. in a drying oven. The resolving yield amounts to 87%. Said compound forms yellow leaflets which are insoluble in water, ether and chloroform, and only slightly soluble in ethanol and acetone. Its melting point is 182° C.; its rotatory power is $[\alpha]_D^{20} = -32.5° \pm 1°$ (concentration: 1% in methanol).

(B) PREPARATION OF N,N-DIBENZYL-L(—)-α-AMINO BUTYRIC ACID 30.5 g. of the salt of L(+)-threo-1-p-nitro phenyl-2-amino propane-1,3-diol and N,N-dibenzyl-L(—)-α-amino butyric acid obtained as described hereinabove under (A) are treated with 67 cc. of N sodium hydroxide solution for 15 minutes while agitating vigorously. The crystallized L(+)-threo-1-p-nitro phenyl-2-amino propane-1,3-diol is separated from the mother liquor. In this manner, 12.3 g., corresponding to 40% of the initially employed resolving agent, are recovered. The filtrate is acidified by the addition of 4.5 cc. of acetic acid. The acid mixture is extracted with chloroform. The chloroform solution is washed with water, dried over magnesium sulfate, and evaporated to dryness in a vacuum. The oily residue is dissolved in 70 cc. of warm methanol. 35 cc. of water are added to said solution and the mixture is allowed to crystallize for one hour with cooling. The crystals are filtered off, washed with a small quantity of 50% methanol, and dried in a drying oven at 80° C. Thereby, 16.7 g. of optically pure N,N-dibenzyl-L-(—)-α-amino butyric acid, corresponding to a yield of 95% of the theoretical yield, are obtained. Said compound forms white crystals which are insoluble in water, soluble in ethanol, acetone, benzene, and chloroform, and only slightly soluble in ether. Its melting point is 133–134° C.; its rotatory power is $[\alpha]_D^{20} = -34.5° \pm 1\%$ (concentration: 2% in 5 N hydrochloric acid) or, respectively, $$[\alpha]_D^{20} = -96.5° \pm 1°$$

(concentration: 2% in methanol).

(C) TREATMENT OF THE MOTHER LIQUORS

The motor liquors obtained on preparing and recrystallizing the salt of L(+)-threo-1-p-nitro phenyl-2-amino propane-1,3-diol and the N,N-dibenzyl-L(—)-α-amino butyric acid are treated as indicated in the preceding examples. Thereby, 12.4 g. of L(+)-threo-1-p-nitro phenyl-2-amino propane-1,3-diol, corresponding to 40% of the initially employed resolving agent, are recovered. 20.2 g. of optically impure N,N-dibenzyl-D(+)-α-amino butyric acid, corresponding to 50.5% of the starting racemic mixture, are obtained. The rotatory power of this acid is $[\alpha]_D^{20} = +75.5° \pm 1°$ (concentration: 2% in methanol). Said impure acid is purified by recrystallization from aqueous 75% methanol or by reaction and salt formation with D(—)-threo-1-p-nitro phenyl-2-amino propane-1,3-diol in the same manner as indicated hereinabove in Examples 1(B), 2(B), or 3(B), respectively.

(D) PREPARATION OF L(+)-α-AMINO BUTYRIC ACID 1.4 g. of N,N-dibenzyl-L(+)-α-amino butyric acid, prepared according to Example 4(B), are dissolved in 15 cc. of 80% ethanol. 0.6 cc. of concentrated hydrochloric acid are added thereto. The acid solution is catalytically hydrogenated at 70° C. in the presence of 0.7 g. of a palladium black catalyst containing 10% of palladium. After hydrogenolysis is completed, the catalyst is filtered off and washed with ethanol. 1.2 cc. of pyridine are added to the filtrate. The mixture is evaporated to dryness in a vacuum. The residue is dissolved in a few cc. of warm absolute ethanol and the solution is allowed to stand for crystallization. The crystals are filtered off and dried in a drying oven at 70° C. 0.4 g. of optically pure L(+)-α-amino butyric acid, corresponding to a yield of 80%, are obtained. Its rotatory power is $[\alpha]_D^{20}=+18.5°$ (concentration: 2% in 5 N hydrochloric acid).

EXAMPLE 5

Resolving of N,N-dibenzyl-DL-leucine (A) PREPARATION OF THE SALT OF L(+)-THREO-1-p-NITRO PHENYL-2-AMINO PROPANE-1,3-DIOL AND N,N-DIBENZYL-L(−)-LEUCINE 18.7 g. of N,N-dibenzyl-DL-leucine and 13.2 g. of L(+)-threo-1-p-nitro phenyl-2-amino propane-1,3-diol are dissolved at a temperature of 50° C. in a mixture of 250 cc. of methanol and 175 cc. of water. The solution is cooled to a temperature of 15° C. within two hours. The crystallized salt is filtered off, washed with a small quantity of 50% methanol, and recrystallized from 220 cc. of 60% methanol. The salt is dried at 80° C. in a drying oven. Thereby, 12 g. of the salt of L(+)-threo-1-p-nitro phenyl-2-amino propane-1,3-diol and N,N-dibenzyl-L(−)-leucine are obtained. The resolving yield is 75%. The compound forms yellow leaflets which are insoluble in water, ether, and benzene, and soluble in ethanol and acetone. The compound melts at 140–141° C.; its rotatory power is $[\alpha]_D^{20}=-23°\pm1°$ (concentration: 2% in methanol).

(B) PREPARATION OF N,N-DIBENZYL-L(−)-LEUCINE 8.3 g. of the salt of L(+)-threo-1-p-nitro phenyl-2-amino propane-1,3-diol and N,N-dibenzyl-L(−)-leucine obtained according to the above given Example 5(A) are treated with 18 cc. of N sodium hydroxide solution for 15 minutes while stirring vigorously. L(+)-threo-1-p-nitro phenyl-2-amino propane-1,3-diol crystallizes and is removed from the solution. In this manner 3.1 g. of the resolving agent, corresponding to a yield of 94%, are recovered. The filtrate is acidified by the addition of 1.5 cc. of acetic acid. The mixture is extracted with chloroform. The chloroform solution is washed with water, dried over magnesium sulfate, and evaporated to dryness in a vacuum. The oily residue is crystallized in aqueous acetic acid and yields N,N-dibenzyl-L(−)-leucine in hydrated form. The yield is quantitative. Said compound, in the anhydrous form, melts at 104–106° C.; its rotatory power is $[\alpha]_D^{20}=-68°\pm1°$ (concentration: 2% in methanol).

(C) TREATMENT OF THE MOTHER LIQUORS

The mother liquors obtained on preparing and recrystallizing the salt of L(+)-threo-1-nitro phenyl-2-amino propane-1,3-diol and N,N-dibenzyl-L(−)-leucine are concentrated by evaporation to a volume of about 200 cc. 46 cc. of N sodium hydroxide solution are added thereto while heating. Thereby, 6.5 g. of the resolving agent are recovered in the same manner as described in the preceding examples. The resulting filtrate is acidified by the addition of 3 cc. of acetic acid and extracted by means of chloroform. The chloroform solution is evaporated to dryness and the residue is taken up, while heating, in 20 cc. of petroleum ether from which 7.7 g. of racemic N,N-di-benzyl leucine, corresponding to 41% of the starting racemic mixture, crystallize. The mother liquors of said crystallization are evaporated to dryness and the residue is treated with 4 g. of D(−)-threo-1-p-nitro phenyl-2-amino propane-1,3-diol in 130 cc. of aqueous 50% methanol. By following the procedure as described hereinabove in Examples 1(B), 2(B), or 3(B), there are obtained 6.2 g. of the salt of D(−)-threo-1-p-nitro phenyl-2-amino propane-1,3-diol and N,N-dibenzyl-D(+)-leucine. Said compound forms yellow leaflets which are insoluble in water, ether and benzene, and soluble in ethanol and acetone. Its melting point is 140–141° C.; its rotatory power is $[\alpha]_D^{20}=+23°\pm1°$ (concentration: 2% in methanol).

(D) PREPARATION OF L(−)-LEUCINE 4.95 g. of L(−)-N,N-dibenzyl leucine prepared according to the preceding example 5(B) are dissolved in 50 cc. of 80% ethanol. 1.5 cc. of concentrated hydrochloric acid and 2 g. of palladium black catalyst containing 6% of palladium are added thereto and the mixture is hydrogenated at 70° C. After hydrogenolysis is completed, the catalyst is filtered off and washed with alcohol. The filtrate is concentrated by evaporation to a volume of about 5 cc. 15 cc. of absolute ethanol and then 2 cc. of pyridine are added thereto. The resulting crystals are filtered off, washed with absolute ethanol and dried in a drying oven at 100° C. 1.7 g. of optically pure I(−)-leucine, corresponding to a yield of 85%, are obtained thereby. The rotatory power of said acid is $[\alpha]_D^{20}=+14°\pm1°$ (concentration: 3% in 5 N hydrochloric acid).

EXAMPLE 6

Resolving of N,N-dibenzyl-DL-threonine (A) PREPARATION OF THE SALT OF L(+)-THREO-1-p-NITRO PHENYL-2-AMINO PROPANE-1,3-DIOL AND N,N-DIBENZYL-D(−)-THREONINE 15 g. of N,N-dibenzyl-DL-threonine and 11 g. of L(+)-threo-1-p-nitro phenyl-2-amino propane-1,3-diol are dissolved in 150 cc. of aqueous 50% methanol while keeping the temperature near the boiling point under reflux. The solution is kept at a temperature of 60° C. for one hour and is then allowed to cool to a temperature of 35° C. within two hours. The crystallized salt is filtered off, washed with a small quantity of water and recrystallized from 100 cc. of aqueous 50% methanol. 10.15 g. of the salt of L(+)-threo-1-p-nitro phenyl-2-amino propane-1,3-diol and N,N-dibenzyl-D(−)-threonine are obtained thereby. The resolving yield amounts to 80%. The compound is obtained in the form of yellow platelets which are insoluble in benzene and chloroform and only slightly soluble in water, ethanol, ether, and acetone. The compound melts at 187–188° C.; its rotatory power is $[\alpha]_D^{20}=-57°\pm1°$ (concentration: 1% in methanol).

(B) PREPARATION OF N,N-DIBENZYL-D(−)-THREONINE 10.15 g. of the salt of L(+)-threo-1-p-nitro phenyl-2-amino propane-1,3-diol and N,N-dibenzyl-D(−)-threonine obtained according to the preceding Example 6(A) are treated with 21 cc. of N sodium hydroxide solution for 15 minutes while stirring vigorously. By following the procedure as indicated in the preceding examples, 4 g. of the resolving agent corresponding to a yield of 48% of the initially employed resolving agent are recovered. In addition, 5.85 g. of N,N-dibenzyl-D(−)-threonine, corersponding to a yield of 98%, are obtained thereby. Said acid, on recrystallization from aqueous 50% methanol, has a melting point of 94–96° C. and a rotatory power of $[\alpha]_D^{20}=-111°\pm1°$ (concentration: 2% in methanol). The compound is obtained in colorless needles which are soluble in ethanol, acetone, chloroform, and ether, only slightly soluble in warm water, and very slightly soluble in cold water.

(C) TREATMENT OF THE MOTHER LIQUORS

The mother liquors obtained on preparing and recrystallizing the salt of L(+)-threo-1-p-nitro phenyl-2-amino propane-1,3-diol and N,N-dibenzyl-D(—)-threonine are combined and concentrated by evaporation to a volume of about 150 cc. 32 cc. of N sodium hydroxide solution are added thereto. On following the procedure as described in the preceding examples, 5.2 g. of the resolving agent are recovered. The alkaline filtrate is acidified by the addition of 3.5 cc. of acetic acid and extracted with chloroform. The chloroform solution is dried and evaporated to dryness in a vacuum. The resulting residue is treated with 5.7 g. of D(—)-threo-1-p-nitro phenyl-2-amino propane-1,3-diol in 75 cc. of aqueous 50% methanol. Thereby, 9.8 g. of the salt of D(—)-threo-1-p-nitro phenyl-2-amino propane-1,3-diol and N,N-dibenzyl-L(+)-threonine are obtained. The melting point of said salt is 187–188°; its rotatory power is $[\alpha]_D^{20} = +57° \pm 1°$ (concentration: 1% in methanol). The yield amounts to 77% calculated for the N,N-dibenzyl-L(+)-threonine contained in the initial racemic mixture. The compound forms yellow platelets which are insoluble in benzene and chloroform, and only slightly soluble in water, ethanol, ether, and acetone.

(D) HYDROGENOLYSIS OF N,N-DIBENZYL-D(—)-THREONINE 2 g. of N,N-dibenzyl-D(—)-threonine dissolved in 30 cc. of 80% ethanol are hydrogenated in the presence of 2 g. of a palladium black catalyst containing 6% of palladium and with the addition of 1 cc. of concentrated hydrochloric acid at a temperature of 70° C. The catalyst is filtered off. The filtrate is concentrated to a volume of 10 cc. 1.5 cc. of pyridine are added thereto, and the precipitate is removed by filtration. Optically pure D(—)-threonine is obtained thereby in a yield of 72%. The rotatory power of said acid is $[\alpha]_D^{20} = -28° \pm 1°$ (concentration: 2% in water).

EXAMPLE 7

*Resolving of N,N-dibenzyl-DL-serine*

(A) PREPARATION OF THE SALT OF L(+)-THREO-1-p-NITRO PHENYL-2-AMINO PROPANE-1,3-DIOL AND N,N-DIBENZYL-L(—)-SERINE 14.25 g. of N,N-dibenzyl-DL-serine and 11 g. of L(+)-threo-1-p-nitro phenyl-2-amino propane-1,3-diol are dissolved, while heating, in 300 cc. of aqueous 25% methanol. The solution is kept for 1 hour at 50° C. and for two more hours at 35° C. so as to cause crystallization of the salt. The crystals are filtered, washed with a small quantity of water, and recrystallized from 160 cc. of aqueous 25% methanol. 9.3 g. of the salt of L(+)-threo-1-p-nitro phenyl-2-amino propane-1,3-diol and N,N-dibenzyl-L(—)-serine are obtained thereby. The resolving yield is 75%. The compound is obtained in the form of yellow leaflets which are only slightly soluble in water, ether, acetone, benzene, and chloroform, and are soluble in ethanol. The compound melts at 164–165° C.; its rotatory power is $[\alpha]_D^{20} = -38° \pm 1°$ (concentration: 1% in methanol).

(B) PREPARATION OF N,N-DIBENZYL-L(—)-SERINE 9.3 g. of the salt of L(+)-threo-1-p-nitro phenyl-2-amino propane-1,3-diol and N,N-dibenzyl-L(—)-serine, obtained according to preceding Example 7(A), are treated with 20 cc. of N sodium hydroxide solution for 15 minutes while stirring. The crystallized resolving agent is filtered off. 3.8 g. thereof are recovered corresponding to a yield of 47% of the initially employed resolving agent. The alkaline filtrate is heated to 40° C. and acidified by the addition of 1.5 cc. of acetic acid. N,N-dibenzyl-L(—)-serine crystallizes in long needles. The mixture is cooled with ice, the crystals are filtered off, washed with a small quantity of water, and dried in a drying oven. 5.05 g. of N,N-dibenzyl-L(—)-serine are obtained thereby. The yield amounts to 95%. The acid has a melting point of 142–143° C.; its rotatory power is $[\alpha]_D^{20} = -79° \pm 1°$ (concentration: 2% in methanol). The compound is soluble in warm water, ethanol, ether, acetone, and chloroform, and only slightly soluble in benzene.

(C) TREATMENT OF THE MOTHER LIQUORS

The mother liquors obtained on preparing and recrystallizing the salt of L(+)-threo-1-p-nitro phenyl-2-amino propane-1,3-diol and N,N-dibenzyl-L(—)-serine are combined and concentrated by evaporation to a volume of about 150 cc. 32 cc. of N sodium hydroxide solution are added thereto. 4.8 g. of the resolving agent, corresponding to a yield of 44% of the initially employed resolving agent are recovered thereby. The alkaline filtrate is acidified by the addition of 3 cc. of acetic acid and extracted with chloroform. The chloroform solution yields, on working up as described hereinbefore in the preceding examples, 8 g. of an optically impure compound which is treated with 6.4 g. of D(—)-threo-1-p-nitro phenyl-2-amino propane-1,3-diol in 250 cc. of aqueous 20% methanol. By working up the reaction mixture in the manner as described hereinbefore in the preceding examples and recrystallizing the resulting salt from 75 cc. of aqueous 20% methanol, 8 g. of the salt of D(—)-threo-1-p-nitro phenyl-2-amino propane-1,3-diol and N,N-dibenzyl-D(+)-serine are obtained thereby. The resolving yield amounts to 64%. Said compound is obtained in the form of yellow leaflets which are only slightly soluble in water, ether, acetone, benzene, and chloroform, and are soluble in ethanol. The melting point of said salt is 164–165° C.; its rotatory power is $[\alpha]_D^{20} = +38° \pm 1°$ (concentration: 1% in methanol).

(D) HYDROGENOLYSIS OF THE N,N-DIBENZYL-L(—)-SERINE 2 g. of N,N-dibenzyl-L(—)-serine in 30 cc. of 80% ethanol are hydrogenated at a temperature of 60–65° C. in the presence of 1 g. of a palladium black catalyst containing 10% of palladium and with the addition of 1 cc. of concentrated hydrochloric acid for 1 hour. The catalyst is filtered off, the filtrate is concentrated to a volume of 10 cc., 1.5 cc. of pyridine are added thereto, and the precipitate is filtered off. Optically pure L(+)-serine is obtained in a yield of 75%. Its rotatory power is $[\alpha]_D^{20} = +15° \pm 1°$ (concentration: 4% in N hydrochloric acid).

In place of the N,N-dibenzyl-DL-amino acids as they are subjected in the preceding examples to the resolving process according to the present invention, there can be used equimolecular amounts of other N,N-dibenzyl-DL-amino acids as they are obtainable according to the process of copending application Serial No. 518,337 of Jesus Anatol and Vesperto Torelli, filed June 27, 1955, such as, for instance:

N,N-dibenzyl-DL-norleucine,
N,N-dibenzyl-DL-isoleucine,
N,N-dibenzyl-DL-phenyl alanine,
N,N-dibenzyl-DL-tryptophane, Otherwise, the process is carried out as set forth in the Examples 1 to 7.

Although a lower aliphatic alcohol such as methanol or ethanol either in anhydrous form or diluted with water, is the preferred solvent in the preparation of the salts of optically active N,N-dibenzyl-α-amino acids with the optically active threo-1-p-nitro phenyl-2-amino propane-1,3-diol, it is also possible to use other solvents provided one of the salts of the enantiomorphic components of the N,N-dibenzyl-DL-α-amino acid with one of the enantiomorphic components of the threo-1-p-nitro phenyl-2-amino propane-1,3-diol is substantially insoluble therein while the other salt remains dissolved therein.

The elevated temperature at which the optically active threo-1-p-nitro phenyl-2-amino propane-1,3-diol is added to the solution of the racemic mixture of the N,N-dibenzyl-α-amino acid to be resolved is preferably between about 50° C. and about 80° C. and should not substantially exceed about 100° C. The reaction mixture, after salt formation, is preferably cooled to a temperature between about 15° C. and about 35° C. The crystallization temperature, preferably, should not exceed about 50° C.

The concentration of the N,N-dibenzyl-DL-α-amino acid in the salt-forming solution is preferably between about 4% and about 20%. The concentration is, of course, dependent upon the solvent employed and the solubility of the optically active salts therein. Optimum conditions can readily be determined for each salt and each individual solvent by simple preliminary experiments.

As alkaline agent for decomposing the optically active salts and for recovering the resolving agent, there is preferably employed an alkali hydroxide solution, such as N sodium hydroxide solution.

Precipitation of the optically active N,N-dibenzyl-α-amino acid from its alkaline solution, after removal of the resolving agent is preferably affected by acidifying said solution with a water soluble organic acid. The most preferred acid employed for this purpose is acetic acid. Other acids such as propionic acid, formic acid and halogenated acetic acid may also be used.

Hydrogenolysis is preferably effected by catalytic hydrogenation whereby a palladium black catalyst has proved to be especially useful. However, other palladium and other catalysts can also be used such as palladium on alumina, palladium on calcium carbonate, palladium on strontium carbonate, platinum catalysts.

Of course, many changes and variations in the preparation of the salts of optically active N,N-dibenzyl-α-amino acids with D(−)- or L(+)-threo-1-p-nitro phenyl-2-amino propane-1,3-diol, the solvents used, the reaction conditions, temperature and duration, the conditions under which dissolution, crystallization, and cooling are effected, the recovery of the precipitated and crystallized salts of the optically active components of the racemic starting material and their recrystallization and purification, the decomposition and splitting up of said salts to produce optically active N,N-dibenzyl-α-amino acids, the hydrogenolysis of said acids to form the free optically active amino acids and the isolation and purification of said optically active amino acids, the methods of working up and utilizing the mother liquors and of isolating and recovering therefrom valuable products, the recovery of the resolving agent, and the like may be made by those skilled in the art in accordance with the principles set forth herein and in the claims annexed hereto.

The resulting N,N-dibenzyl amino acids according to the present invention can readily be converted into peptides, for instance, according to the process of copending application Serial No. 488,702 of Gaston Amiard and Leon Velluz entitled New N-Benzyl Peptides and a Process of Making Same, which application was filed on February 16, 1955.

According to the process of said copending application, the N,N-dibenzyl amino acid is first converted into the hydrochloride of its acid chloride by reacting the hydrochloride of the N,N-dibenzyl amino acid with phosphorus pentachloride in benzene solution and condensing said acid chloride with the hydrochloride of the desired amino acid ester, saponifying the resulting dibenzyl dipeptide ester, and subjecting the dibenzyl dipeptide obtained thereby to hydrogenolysis to split off the benzyl groups.

In a similar manner tri- and polypeptides can be obtained by using dibenzyl di- or polypeptides as starting materials and reacting said peptides with amino acid esters. Such procedures are also described in detail in the above mentioned copending application Serial No. 488,702.

The N,N-dibenzyl amino acids according to the present invention and the di- and polypeptides obtained by means of said N,N-dibenzyl amino acids are of great value in the ultimate synthesis of protein-like compounds. They may also be used, after splitting off the benzyl groups, for nutritional purposes, for instance, in place of protein hydrolysates. They permit the administration of very definite and specific amino acids and peptides to overcome certain amino acid deficiencies. They are of considerable advantage over known protein hydrolysates because they allow proper, precise, and controlled dosage. The amino acids and peptides can also be used for technical purposes in place of protein hydrolysates and the like.

We claim:

1. In a process of resolving N,N-dibenzyl-DL-α-amino acids, the steps comprising adding an optically active threo-1-p-nitro phenyl-2-amino propane-1,3-diol to a solution of the N,N-dibenzyl-DL-α-amino acid of the formula

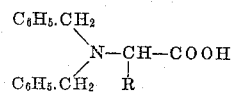

wherein R indicates a member selected from the group consisting of an alkyl radical with 1 to 4 carbon atoms, an alkyl radical with 1 to 4 carbon atoms substituted by a hydroxyl group, the benzyl radical, and the β-indolyl methylene radical, separating the resulting less soluble salt of said optically active threo-1-p-nitro phenyl-2-amino propane-1,3-diol and one of the two enantiomorphic components of the N,N-dibenzyl-DL-α-amino acid from the more soluble salt of said optically active threo-1-p-nitro phenyl-2-amino propane-1,3-diol and the other one of the two enantiomorphic components of the N,N-dibenzyl-DL-α-amino acid, separately isolating the optically active salts, splitting off the resolving agent from the thus separated and isolated salts, and recovering the optically active components of said N,N-dibenzyl-DL-α-amino acid from the splitting off reaction mixture.

2. A process according to claim 1, wherein the optically active threo-1-p-nitro phenyl-2-amino propane-1,3-diol is added to a solution of the N,N-dibenzyl-DL-α-amino acid in a lower aliphatic alcohol.

3. The salts of an optically active threo-1-p-nitro phenyl-2-amino propane-1,3-diol and an optically active N,N-dibenzyl-α-amino acid of the formula

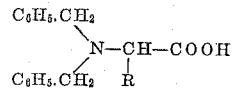

wherein R indicates a member selected from the group consisting of an alkyl radical with 1 to 4 carbon atoms, an alkyl radical with 1 to 4 carbon atoms substituted by a hydroxyl group, the benzyl radical, and the β-indolyl methylene radical.

4. The salt of L(+)-threo-1-p-nitro phenyl-2-amino propane-1,3-diol and N,N-dibenzyl-L-(−)-leucine.

5. The salt of L(+)-threo-1-p-nitro phenyl-2-amino propane-1,3-diol and N,N-dibenzyl-D(−)-threonine.

6. The salt of L(+)-threo-1-p-nitro phenyl-2-amino propane-1,3-diol and N,N-dibenzyl-L(−)-serine.

7. The salt of D(−)-threo-1-p-nitro phenyl-2-amino propane-1,3-diol and N,N-dibenzyl-D(+)-alanine.

8. The salt of D(−)-threo-1-p-nitro phenyl-2-amino propane-1,3-diol and N,N-dibenzyl-D(+)-valine.

References Cited in the file of this patent

FOREIGN PATENTS

| | | |
|---|---|---|
| 634,073 | Great Britain | Mar. 15, 1950 |
| 707,903 | Great Britain | Apr. 28, 1954 |
| 1,100,016 | France | Mar. 30, 1955 |

OTHER REFERENCES

Gilman: Organic Chemistry 2nd Ed., vol. 1, pages 256–60 (1943).